G. CANDEE.
Wind-Wheels.
No. 153,237.
Patented July 21, 1874.
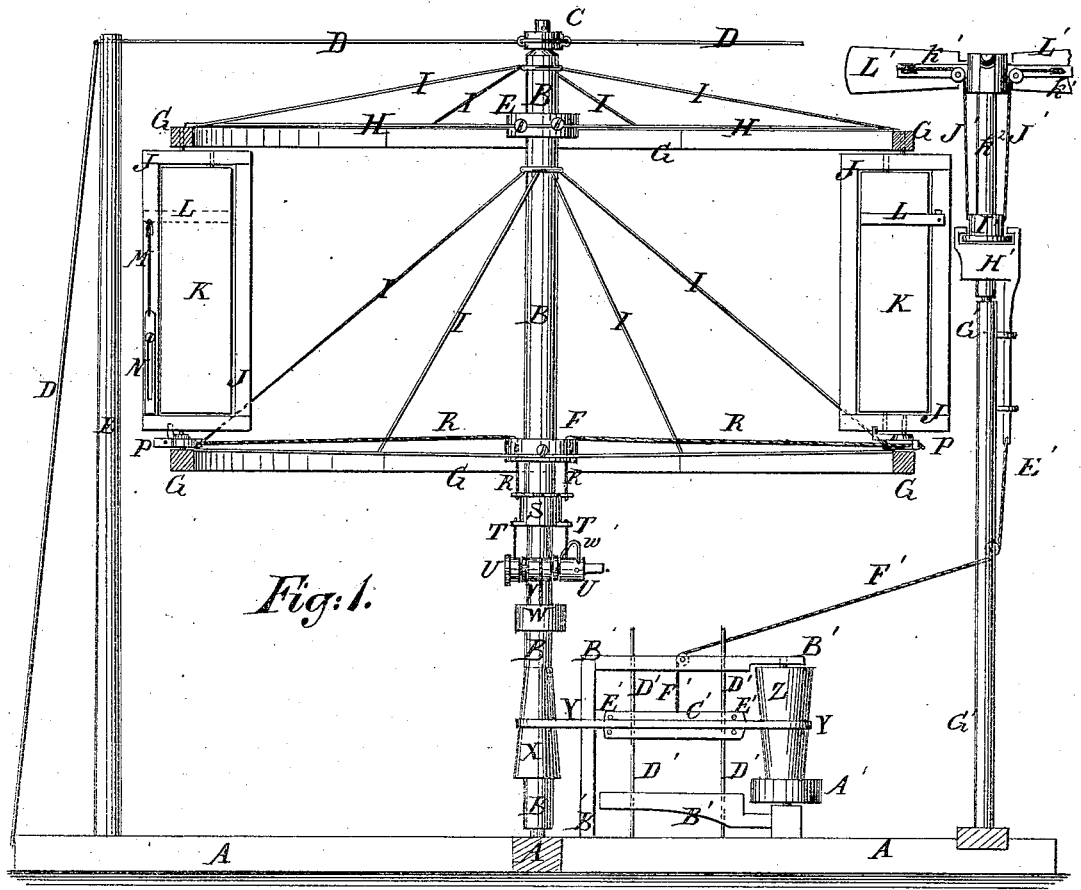
Fig: 1.
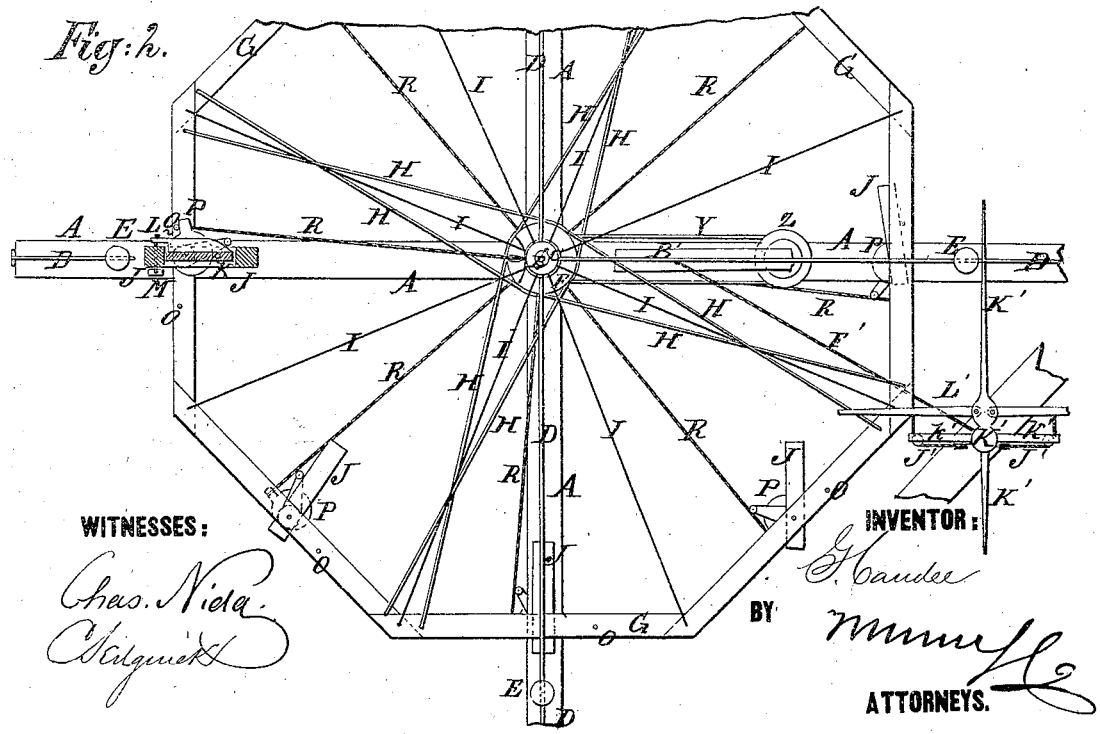
Fig: 2.
WITNESSES:
INVENTOR:
G. Candee
BY
ATTORNEYS.

UNITED STATES PATENT OFFICE.

GEORGE CANDEE, OF PADDY'S RUN, OHIO.

IMPROVEMENT IN WIND-WHEELS.

Specification forming part of Letters Patent No. 153,237, dated July 21, 1874; application filed May 16, 1874.

*To all whom it may concern:*

Be it known that I, GEORGE CANDEE, of Paddy's Run, in the county of Butler and State of Ohio, have invented a new and useful Improvement in Wind-Wheels, of which the following is a specification:

Figure 1 is a vertical section of a wind-wheel illustrating my invention. Fig. 2 is a top view of the same.

Similar letters of reference indicate corresponding parts.

My invention has for its object to improve the construction of wind-wheels in such a way as to make them less expensive in construction than the ordinary wind-wheels, and enable them to be controlled by the action of the wind itself, so as to drive the machinery at a uniform rate, whether the wind be strong or gentle, and to greatly increase their capacity for power.

The invention will first be fully described, and then pointed out in the claims.

A represents the base or foundation frame, to which is pivoted the lower end of the vertical wheel-shaft B, the upper end of which revolves in a cap, C, which is held in place by the guy-chains or rods D, the lower ends of which are secured to the base-frame A, or to some other suitable support. In some cases it may be necessary to connect the chains D with the upper ends of posts E, to keep the upper parts of said chains D out of the way of the wheel. To the shaft B are bolted or otherwise secured the hubs F, to which the rims G are connected by chains or rods H. The chains or rods H are arranged in pairs. The middle parts of the chains of each pair are secured to the opposite sides of the hubs F, and their ends cross each other and are attached to the rims G, so as to hold the rims from twisting around the shaft B. The rims G are sustained by the chains I, the outer ends of which are attached to the said rims G, and their inner ends are attached to the shaft B, as shown in Fig. 1.

The rims G may be made circular or polygonal, as may be desired.

J K are the wings, consisting of a frame, J, and panel K, the said panel fitting snugly into said frame. The ends of the panel K are pivoted eccentrically to the ends of the frame J.

To the side of the panel K is attached an arm, L, with its ends projecting at the side edge of the panel farthest from its axis. To the projecting end of the arm L is attached a chain, M, which passes over a pulley pivoted in a slot in the side bar of the frame J, and to its other end is attached a weight, N, which is slotted longitudinally to receive a guide-pin to keep it in place, while allowing it to slide up and down freely.

The weight N should be of sufficient size to hold the panel K in line with the frame J, under ordinary circumstances; but should the wind greatly increase in force, the panel K will turn upon its axis, presenting its edge to the wind, the weight N bringing it back to its place as soon as the force of the wind abates.

The ends of the frames J are pivoted eccentrically to the rims G, and, when the wings are out of the wind, rest against stops or a stop-rod, O, attached to the rims G. When the wings are taking the wind, the frame J rests against a stop formed upon a block, P, which is pivoted to the lower rim G by the lower pivot of the frame J, and the movements of which are limited by a stop-pin, Q, attached to the said lower rim. The wing J can as well attach to a pair of arms projecting from the shaft B. To an arm of the stop-block P is attached the end of a chain, R, which passes around a pulley pivoted to the lower hub F, passes down through a hole in said lower hub, and its other end is attached to a collar or sleeve, S, placed loosely upon the shaft B, and to which are attached, upon the opposite sides of the shaft B, the upper ends of two short chains, T, the lower ends of which are attached to a short horizontal shaft or windlass, U. The windlass U works in bearings attached to the shaft B, and to its middle part is attached a short chain, V, to the lower end of which is attached a weight, W, which is made ring-shaped, so that the shaft B may pass through it to keep it in place.

By this construction, the wings J K are held against the wind by the weight W, and should the wind increase in force, the stop-blocks P will be pushed back, raising the weight W.

The chains R T V should be of such a length as to allow the stop-blocks P to be pushed back till the wings J K stand edge to the wind, so that the wheel will be stopped by an excess of wind, and will start again automatically as the wind abates.

The wheel may also be stopped by winding the weight W up to the windlass, and locking the windlass with the dog or hook $w$. In large wheels a platform should be erected and attached to the shaft B, just below the windlass, for a person to stand upon when operating it. To the lower part of the shaft B is attached, or upon it is formed, a cone-pulley, X, around which passes a band, Y, which also passes around a cone-pulley, Z, rigidly connected with the driving-pulley A', and placed in a reversed position with respect to the cone-pulley X, so that the band Y will alway be taut, whatever position it may have upon the pulleys X Z. This construction enables the speed of the machinery to be regulated by moving the belt Y upon the pulleys X Z. The pulley X can be geared to the shaft B, as well as attached in the way shown. The pulleys Z A' revolve in bearings in the frame B', attached to the base-frame A. Within the frame B', and parallel with and between the parts of the belt Y, is placed a bar, C', which is provided with guide-rods B', parallel with the axes of the pulleys X Z, and which work in guide-holes in the bars of the frame B'. To the bar C' are also attached forked or slotted arms E', through the forks or slots of which the parts of the belt Y pass, so that the said belt may be shifted by adjusting the bar C'. To the center of the bar C' is attached the end of a cord or chain, F', which passes around a guide-pulley pivoted to the frame B', around a guide-pulley pivoted to the post G', and its other end is attached to the collar H', or to an arm attached to said collar. The collar H' slides up and down loosely upon the post G', and to the upper part of its opposite sides are attached, or upon it are formed, shouldered lugs or catches, to receive and hold the flanges of the collar I', also placed upon the post G', in such a way that it may turn freely while moving up and down with the collar H'. To the opposite sides of the swiveled collar I' are attached the lower ends of two cords or chains, J', which pass over guide-pulleys pivoted to the hub of the vane K', around guide-pulleys pivoted to the outer ends of arms $k^1$, rigidly attached to the hub of the said vane and projecting upon its opposite sides, and thence to the outer ends of the wings L', the inner ends of which are hinged to the opposite sides of the vane K', a little in the rear of its hub. The vane K' is made with a sleeve or long socket, $k^2$, which fits and turns upon the upper end of the post G', and is made of such a length as to pass down through the collars I' and H', and is grooved or slotted to receive pins, feathers, or keys attached to or formed upon the said collar I', so that the vane K' may carry the said collar with it as it turns, while allowing it to move up and down freely. This construction prevents the cords or chains J' from being wound around the post G' by the movements of the vane K'. By this construction, as the wind increases in force, the outer ends of the wings L' are forced back, which raises the belt-shifter and prevents the machine from being driven any faster by the increased velocity of the wind-wheel. Should the wind still increase in force the other devices are operated to throw the wings of the wind-wheel out of the wind. As the force of the wind abates the belt-shifter drops downward, which increases the relative velocity of the machinery. The vane K' and its attachments may be used to operate a brake to regulate the movement of the machinery, and the belt-shifter C' D' E' can be controlled by an ordinary governor if desired.

Having thus described my invention, I claim as new, and desire to secure by Letters Patent—

1. The combination of the pivoted stop-blocks P, the chains R, the collar S, the chains T, the shaft or windlass U, chain V, and weight W with the pivoted wings J K and the wheel F G H I, substantially as herein shown and described.

2. The combination of the cone-pulley X Z, the belt Y, and the belt-shifter C' D' E' with the shaft B of a wind-wheel, and with the driving-pulley A', substantially as herein shown and described.

3. The combination of the hinged wings L', the rigid arms $k^1$, the chains J', the swiveled collar I', sliding collar H', and chain F' with a vane, K', to adapt it to serve as a governor or regulator, substantially as herein shown and described.

GEORGE CANDEE.

Witnesses:
 JANE ANN BURNETT,
 ELIZA ANN CANDEE.